(12) United States Patent
Tang (10) Patent No.: US 10,986,671 B2
(45) Date of Patent: Apr. 20, 2021

(54) TECHNIQUES FOR DETERMINING NON-CONTENTION RANDOM ACCESS RESOURCE, NETWORK DEVICE, AND TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/846,694

(22) Filed: Apr. 13, 2020

(65) Prior Publication Data

US 2020/0245374 A1    Jul. 30, 2020

Related U.S. Application Data (63) Continuation of application No. PCT/CN2017/111159, filed on Nov. 15, 2017.

(51) Int. Cl.
*H04W 24/10* (2009.01)
*H04W 74/08* (2009.01)
(Continued)

(52) U.S. Cl.
CPC ....... *H04W 74/0833* (2013.01); *H04W 24/10* (2013.01); *H04W 72/042* (2013.01); *H04W 72/10* (2013.01)

(58) Field of Classification Search
CPC ........... H04W 74/0833; H04W 72/042; H04W 72/10; H04W 24/10
See application file for complete search history.

(56) References Cited

U.S. PATENT DOCUMENTS

| 2012/0188961 A1* | 7/2012 | Suzuki | H04W 74/0833 370/329 |
| 2014/0105167 A1* | 4/2014 | Suzuki | H04W 74/0866 370/329 |

(Continued)

FOREIGN PATENT DOCUMENTS

| CN | 102076055 A | 5/2011 | |
| CN | 103209441 A * | 7/2013 | ............ H04W 28/16 |

(Continued)

OTHER PUBLICATIONS

International search report for PCT/CN2017/111159, dated Dec. 28, 2017.

(Continued)

*Primary Examiner* — Lakeram Jangbahadur
(74) *Attorney, Agent, or Firm* — Perkins Coie LLP (57) ABSTRACT

A method for determining a non-contention random access resource, a network device, and a terminal device are provided. The method includes: generating, by a network device, indication information, wherein the indication information is configured to indicate one of at least two uplink carriers that can be used by a terminal device to perform non-contention random access, wherein the at least two uplink carriers at least comprise an uplink carrier and a supplementary uplink carrier; and sending, by the network device, the indication information to the terminal device. In the solutions of the disclosed embodiments, the network device sends the indication information to the terminal device, so that the terminal device can determine the non-contention random access resource when having at least two uplink carriers.

17 Claims, 2 Drawing Sheets

(51) Int. Cl.
H04W 72/04 (2009.01)
H04W 72/10 (2009.01)

(56) References Cited

U.S. PATENT DOCUMENTS

| | | | |
|---|---|---|---|
| 2016/0100428 A1* | 4/2016 | Suzuki | H04W 72/0413 370/329 |
| 2019/0149384 A1* | 5/2019 | Kim | H04L 27/2666 370/328 |
| 2020/0178333 A1* | 6/2020 | Liu | H04W 74/006 |

FOREIGN PATENT DOCUMENTS

| | | | | |
|---|---|---|---|---|
| CN | 103209441 A | | 7/2013 | |
| CN | 103299693 A | | 9/2013 | |
| CN | 104348600 A | * | 2/2015 | H04L 5/00 |
| CN | 104348600 A | | 2/2015 | |
| EP | 3217746 A1 | | 9/2017 | |
| EP | 3639588 A1 | | 4/2020 | |
| EP | 3661295 A1 | | 6/2020 | |
| EP | 3668254 A1 | | 6/2020 | |
| WO | 2018230603 A1 | | 12/2018 | |

OTHER PUBLICATIONS

Supplementary European Search Report dated Oct. 14, 2020 of European Patent Application No. 17932418.1 (10 pages).
Examination Report dated Feb. 1, 2021 of Russian Patent Application No. 2020119408 (10 pages).
Search Report dated Jan. 29, 2021 of Russian Patent Application No. 2020119408 (2 pages).

* cited by examiner

TECHNIQUES FOR DETERMINING NON-CONTENTION RANDOM ACCESS RESOURCE, NETWORK DEVICE, AND TERMINAL DEVICE

CROSS-REFERENCE TO RELATED APPLICATIONS

This application is a continuation of PCT Application No. PCT/CN2017/111159, filed on Nov. 15, 2017, the disclosure of which is hereby incorporated by reference in its entirety.

TECHNICAL FIELD

Embodiments of the present disclosure relate to the field of communications, and more specifically, to a method for determining a non-contention random access resource, by a network device, and by a terminal device.

BACKGROUND

As people impose increasing requirements for speed, delay, high-speed mobility, and energy efficiency, and as services in the future become diversified and complex, the 3rd Generation Partnership Project (3GPP) International Standards Organization has begun to develop 5th-Generation (5G) mobile communications technology. During early deployment of new radio (NR) technology, complete NR coverage is difficult to obtain. Therefore, typical network coverage is a wide-area long term evolution (LTE) coverage mode and an island NR coverage mode. In addition, a large number of LTE deployments are below 6 GHz, and few spectrums below 6 GHz can be used for 5G. Therefore, in the NR, spectrum applications above 6 GHz need to be developed. However, high-band coverage is limited and signal fades fast.

In some systems, since an uplink power of a terminal device is limited, and frequency of an NR spectrum is relatively high (high frequency indicates a large propagation loss), uplink coverage is limited. In order to improve uplink coverage, an LTE spectrum (which has relatively lower frequency) is utilized as an auxiliary uplink spectrum (that is, there is one auxiliary uplink carrier), so that uplink coverage can be improved.

However, when the terminal device has no supplementary uplink (SUL), when a non-contention random access resource is allocated to the terminal device in a form of radio resource control (RRC) or a physical downlink control channel (PDCCH) order, there is only one uplink carrier. Therefore, the terminal device clearly knows an allocation status of the non-contention random access resource, so that the terminal device can correctly select the non-contention random access resource to initiate a random access process.

However, when there is a supplementary uplink (SUL), for example, the terminal device has at least two uplink (UL) carriers. In a current allocation manner, the terminal device does not know a resource of an uplink carrier to be used.

SUMMARY

The disclosed embodiments include a method for determining a non-contention random access resource, a network device, and a terminal device. When having at least two uplink (UL) carriers, the terminal device can determine the non-contention random access resource.

According to a first aspect, a method for determining a non-contention random access resource is provided, including:

generating, by a network device, indication information, the indication information indicating a first resource of a first uplink carrier and/or a second resource of a second uplink carrier that are/is used by a terminal device for non-contention random access, and a frequency of the first uplink carrier being different from a frequency of the second uplink carrier; and sending, by the network device, the indication information to the terminal device.

In some embodiments, the network device sends the indication information to the terminal device, so that the terminal device can determine the non-contention random access resource when having the first uplink carrier and the second uplink carrier.

In some embodiments, the indication information includes identification information of the first uplink carrier and information for indicating the first resource.

In some embodiments, the indication information includes identification information of the second uplink carrier and information for indicating the second resource.

In some embodiments, before the generating, by a network device, indication information, the method further includes:

receiving, by the network device, a channel quality measurement report sent by the terminal device; where the generating, by a network device, indication information includes:

determining, by the network device according to the channel quality measurement report, an uplink carrier used by the terminal device for non-contention random access; and generating, by the network device, the indication information according to the uplink carrier used by the terminal device for non-contention random access.

In some embodiments, the channel quality measurement report includes: a reference signal received power RSRP and/or reference signal received quality RSRQ of a cell corresponding to the first uplink carrier and an RSRP and/or RSRQ of a cell corresponding to the second uplink carrier.

In some embodiments, the indication information includes: identification information of the first uplink carrier, identification information of the second uplink carrier, information for indicating the first resource, and information for indicating the second resource.

In some embodiments, the indication information further includes:

priority information corresponding to the first resource and/or priority information corresponding to the second resource.

In some embodiments, before the generating, by a network device, indication information, the method further includes:

determining, by the network device, the priority information corresponding to the first resource and/or the priority information corresponding to the second resource according to at least one of the following information: processing load of the first uplink carrier, processing load of the second uplink carrier, a load status of a physical random access channel PRACH resource of the first uplink carrier, and/or a load status of a PRACH resource of the second uplink carrier.

In some embodiments, the resource used by the terminal device for non-contention random access includes identification information of a preamble and a physical random access channel PRACH resource for sending the preamble.

In some embodiments, the sending, by the network device, the indication information to the terminal device includes:

sending, by the network device, radio resource control RRC signaling to the terminal device, the RRC signaling including the indication information.

In some embodiments, the sending, by the network device, the indication information to the terminal device includes:

sending, by the network device, a physical downlink control channel PDCCH order to the terminal device, the PDCCH order including the indication information.

According to a second aspect, a method for determining a non-contention random access resource is provided, including:

receiving, by a terminal device, indication information sent by a network device, the indication information indicating a first resource of a first uplink carrier and/or a second resource of a second uplink carrier that are/is used by the terminal device for non-contention random access, and a frequency of the first uplink carrier being different from a frequency of the second uplink carrier; and performing, by the terminal device, random access according to the indication information.

In some embodiments, the indication information includes identification information of the first uplink carrier and information for indicating the first resource.

In some embodiments, the indication information includes identification information of the second uplink carrier and information for indicating the second resource.

In some embodiments, before the receiving, by a terminal device, indication information sent by a network device, the method further includes:

sending, by a terminal device, a channel quality measurement report to the network device, so that the network device generates the indication information according to the channel quality measurement report.

In some embodiments, the channel quality measurement report includes: a reference signal received power RSRP and/or reference signal received quality RSRQ of a cell corresponding to the first uplink carrier and an RSRP and/or RSRQ of a cell corresponding to the second uplink carrier.

In some embodiments, the indication information includes: identification information of the first uplink carrier, identification information of the second uplink carrier, information for indicating the first resource, and information for indicating the second resource.

In some embodiments, the indication information further includes:

priority information corresponding to the first resource and/or priority information corresponding to the second resource.

In some embodiments, the resource used by the terminal device for non-contention random access includes:

identification information of a preamble and a physical random access channel PRACH resource for sending the preamble.

In some embodiments, the receiving, by a terminal device, indication information sent by a network device includes:

receiving, by the terminal device, radio resource control RRC signaling sent by the network device, the RRC signaling including the indication information.

In some embodiments, the receiving, by a terminal device, indication information sent by a network device includes:

receiving, by the terminal device, a physical downlink control channel PDCCH order sent by the network device, the PDCCH order including the indication information.

According to a third aspect, a network device is provided, including:

a generating unit configured to generate indication information, the indication information indicating a first resource of a first uplink carrier and/or a second resource of a second uplink carrier that are/is used by a terminal device for non-contention random access, and a frequency of the first uplink carrier being different from a frequency of the second uplink carrier; and a transceiving unit configured to send the indication information to the terminal device.

According to a fourth aspect, a network device is provided, including:

a processor configured to generate indication information, the indication information indicating a first resource of a first uplink carrier and/or a second resource of a second uplink carrier that are/is used by a terminal device for non-contention random access, and a frequency of the first uplink carrier being different from a frequency of the second uplink carrier; and a transceiver configured to send the indication information to the terminal device.

According to a fifth aspect, a terminal device is provided, including:

a transceiving unit configured to receive indication information sent by a network device, the indication information indicating a first resource of a first uplink carrier and/or a second resource of a second uplink carrier that are/is used by the terminal device for non-contention random access, and a frequency of the first uplink carrier being different from a frequency of the second uplink carrier; and a processing unit configured to perform random access according to the indication information.

According to a sixth aspect, a terminal device is provided, including:

a transceiver configured to receive indication information sent by a network device, the indication information indicating a first resource of a first uplink carrier and/or a second resource of a second uplink carrier that are/is used by the terminal device for non-contention random access, and a frequency of the first uplink carrier being different from a frequency of the second uplink carrier; and a processor configured to perform random access according to the indication information.

According to a seventh aspect, a computer readable medium is provided for storing a computer program, the computer program including an instruction for performing the foregoing method embodiment according to the first aspect or the second aspect.

According to an eighth aspect, a computer chip is provided, including:

an input interface, an output interface, at least one processor, a memory, where the processor is configured to execute code in the memory, and when the code is executed, the processor can implement various processes performed by a network device in the foregoing method for determining a non-contention random access resource according to the first aspect or the second aspect.

According to a ninth aspect, a computer chip is provided, including:

an input interface, an output interface, at least one processor, a memory, where the processor is configured to execute code in the memory, and when the code is executed, the processor can implement various processes performed by a terminal device in the foregoing method for determining a non-contention random access resource according to the first aspect or the second aspect.

According to a tenth aspect, a communications system is provided, including the foregoing network device and terminal device.

DETAILED DESCRIPTION

Figure 1:
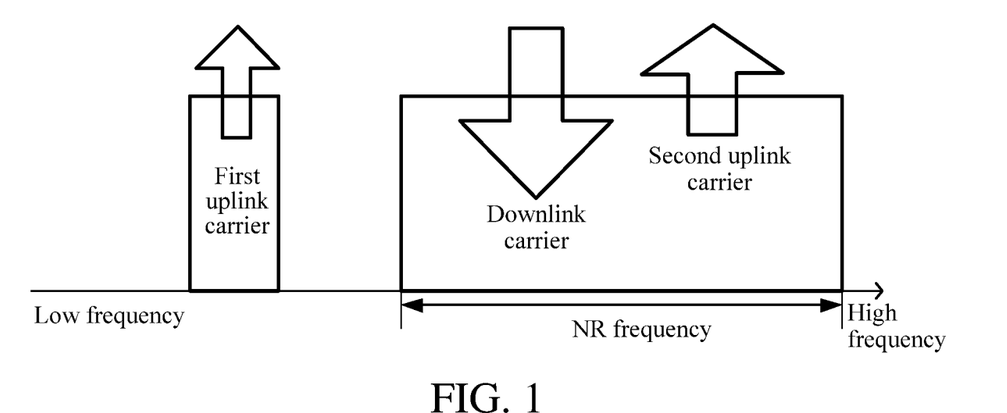
FIG. 1 is an example of an application scenario according to some embodiments.

FIG. 1 is an example of an application scenario according to some embodiments.

As shown in FIG. 1, a terminal device may have one downlink carrier and two uplink carriers (a first uplink carrier and a second uplink carrier shown in FIG. 1). In particular, the first uplink carrier and the downlink carrier may be carriers on an NR high frequency band, and the second uplink carrier may be a carrier on an LTE low frequency band. It should be understood that the terminal device shown in FIG. 1 with two uplink carriers is merely an exemplary description, and no specific limitation is imposed in this embodiment. For example, the terminal device can also support three uplink carriers and the like.

It should be understood that introducing the second uplink carrier is intended to improve uplink coverage of the NR high frequency band.

In particular, since an uplink power of the terminal device is limited, and frequency of an NR spectrum is relatively high (high frequency indicates a large propagation loss), uplink coverage of NR is limited. In order to improve uplink coverage, a data transmission method is provided in this embodiment. An LTE spectrum (which has relatively lower frequency) is used as a supplementary uplink carrier, so that an uplink coverage effect can be improved.

For example, a combination of the first uplink carrier and the second uplink carrier may be similar to carrier aggregation (CA) in LTE, except that there is no paired downlink. In other words, from a perspective of band combination, the second uplink carrier is a cell with an only uplink but no paired downlinks, but the uplink of the cell is controlled by a specific downlink carrier, that is, when the second uplink carrier is configured, the second uplink carrier is a secondary serving cell (SCell) without a downlink, and control of the second uplink carrier depends on a primary serving cell (PCell).

It should be understood that embodiments are applicable to any communications system including multiple uplinks. For example, a first communications system and a second communications system may be various communications systems, such as a global system for mobile communications (GSM) system, a code division multiple access (CDMA) system, a wideband code division multiple access (WCDMA) system, a general packet radio service (GPRS), a long term evolution (LTE) system, LTE time division duplex (TDD) system, a universal mobile telecommunications system (UMTS), etc.

In addition, various embodiments are described in combination of a network device (first to fourth network devices) and a terminal device.

The network device may refer to any type of entity on a network side for sending or receiving a signal. For example, the network device may be user equipment (UE) in machine type communication (MTC), a base transceiver station (BTS) in a GSM or CDMA, a Node B (NodeB) in WCDMA, an evolutional Node B (eNB or eNodeB) in LTE, a base station device in a 5G network, etc.

The terminal device may be any terminal device. In particular, the terminal device may communicate with one or more core networks via a radio access network (RAN), and may also be referred to as an access terminal, a UE, a user unit, a subscriber station, a mobile station, a mobile console, a remote station, a remote terminal, a mobile device, a user terminal, a terminal, a wireless communication device, a user agent, or a user device. For example, the terminal device may include but is not limited to a cellular phone, a cordless phone, a Session Initiation Protocol (SIP) phone, a wireless local loop (WLL) station, a personal digital assistant (PDA), a handheld device with a wireless communication function, a computing device, or other processing devices connected to a wireless modem, an in-vehicle device, a wearable device, a terminal device in a future 5G network, etc.

Combined with a non-competitive random access process, it can be found that, in a scenario of a non-supplementary uplink, when a non-contention random access resource is allocated to a UE in a form of RRC or a PDCCH order, there is only one uplink carrier. Therefore, the UE clearly knows an allocation status of the non-contention random access resource, so that the UE can correctly select the non-contention random access resource to initiate a random access process. However, in the scenario of a SUL, there are at least two uplink (UL) carriers. Therefore, in a current allocation manner, the terminal device does not know a resource of an uplink carrier to be used.

Therefore, in this embodiment, a method for determining a non-contention random access resource is provided. Therefore, when having at least two uplink (UL) carriers, the terminal device can determine the non-contention random access resource.

Contention random access in this embodiment is described below with reference to FIG. 2.

Figure 2:
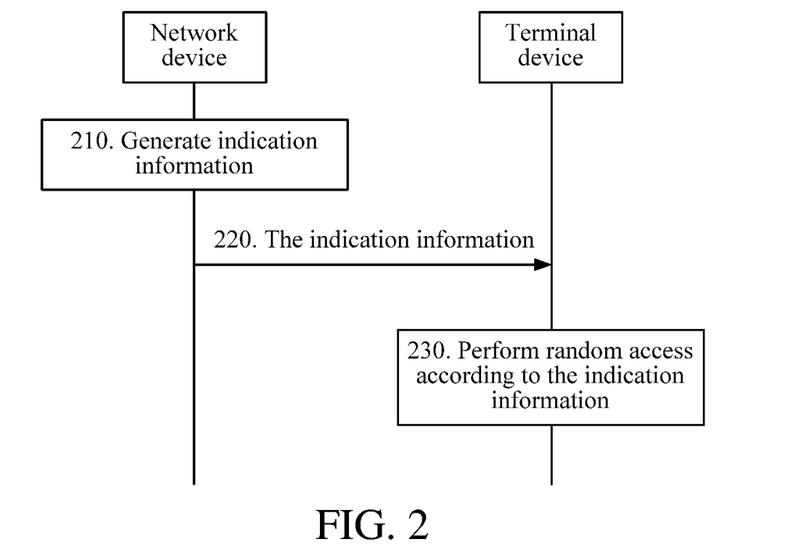
FIG. 2 is a schematic flowchart of a method for determining a non-contention random access resource according to some embodiments.

FIG. 2 is a schematic flowchart of a method for non-contention random access according to an embodiment of the present invention. In 210, a network device generates indication information. In 220, the network device sends the indication information to a terminal device. In 230, the terminal device performs random access according to the indication information.

In particular, the network device generates the indication information, the indication information indicating a first resource of a first uplink carrier and/or a second resource of a second uplink carrier that are/is used by the terminal device for non-contention random access, and a frequency of the first uplink carrier being different from a frequency of the second uplink carrier; and the network device sends the indication information to the terminal device. Therefore, the terminal device performs random access according to the received indication information.

An exemplary description of specific content of the indication information is given below.

In an embodiment, the indication information may include a carrier resource selected by the network device for the terminal device. In other words, the network device directly indicates, for the terminal device, the carrier resource selected by the network device.

For example, the indication information may include identification information of the first uplink carrier and information for indicating the first resource.

For another example, the indication information may include identification information of the second uplink carrier and information for indicating the second resource.

In this embodiment, the carrier resource is selected by the network device. Optionally, before the network device generates the indication information, the network device receives a channel quality measurement report sent by the terminal device. Then the network device determines, according to the channel quality measurement report, an uplink carrier used by the terminal device for non-contention random access, and generates the indication information according to the uplink carrier used by the terminal device for non-contention random access.

It should be understood that the channel quality measurement report includes but is not limited to:

a reference signal received power (RSRP) and/or reference signal received quality (RSRQ) of a cell corresponding to the first uplink carrier and an RSRP and/or RSRQ of a cell corresponding to the second uplink carrier.

In particular, the network device allocates a set of non-contention random access resources to the terminal device, and indicates a UL carrier to which the set of non-contention random access resources belong. In particular, the network device may select, according to the measurement result report reported by the terminal device, the UL carrier to which the resource for the terminal device to initiate non-contention random access belongs. For example, in a handover scenario, the network device knows signal quality. In this case, a current cell in which the terminal device is currently located needs to send, to a target cell, a measurement result (e.g., an RSRP/RSRQ) of the target cell obtained by the terminal device, so that the target cell selects an UL carrier. In this embodiment of the present invention, when allocating a dedicated random access resource for the terminal device, the terminal device may use the measurement result.

In another embodiment, the indication information may include a resource of each uplink carrier. In other words, the network device directly indicates, for the terminal device, all available resources of uplink carriers, and the terminal device finally selects a resource for performing non-contention random access.

For example, the indication information may include: identification information of the first uplink carrier, identification information of the second uplink carrier, information for indicating the first resource, and information for indicating the second resource.

In particular, a corresponding UL carrier number is configured for each set of non-contention random access resources allocated by the network device to the terminal device, indicating an UL carrier to which the non-contention random access resource belongs, so that the terminal device can learn a correspondence between the non-competition random access resource and the UL carrier. For example, the terminal device may select a non-contention random access resource according to the RSRP measurement result, and initiates a random access process. For example, when the RSRP measurement result is greater than a specific threshold, a UE may select a non-contention random access resource corresponding to an NR UL. Otherwise, the UE may select only a non-contention random access resource corresponding to a SUL.

The indication information may further include:

priority information corresponding to the first resource and/or priority information corresponding to the second resource.

Therefore, when the network device allocates two sets of non-contention random access resources, a priority indication is configured for each set of non-contention random access resources, indicating a set of non-contention random access resources preferentially used by the terminal device when a status of a measured signal is qualified (e.g., an RSRP is greater than a specific threshold).

Optionally, before the network device generates the indication information, the network device determines the priority information corresponding to the first resource and/or the priority information corresponding to the second resource according to at least one of the following information:

processing load of the first uplink carrier, processing load of the second uplink carrier, a load status of a physical random access channel (PRACH) resource of the first uplink carrier, and a load status of a PRACH resource of the second uplink carrier.

In other words, the priority information corresponding to the first resource and/or the priority information corresponding to the second resource in the indication information may be set based on the processing load of the two uplink carriers and the load statuses of the PRACH resources of the two carriers.

It should be understood that, in this embodiment of the present invention, the resource used by the terminal device for non-contention random access includes, but is not limited to, identification information of a preamble and a PRACH resource for sending the preamble.

Exemplary description of a manner of transmitting the indication information in this embodiment of the present invention is given below.

In an embodiment, the network device sends radio resource control (RRC) signaling to the terminal device, the RRC signaling including the indication information. In other words, the indication information is carried in the RRC signaling to be sent to the terminal device.

In another embodiment, the network device sends a physical downlink control channel (PDCCH) order to the terminal device, the PDCCH order including the indication information. In other words, the indication information is carried in the PDCCH order to be sent to the terminal device.

Figure 3:
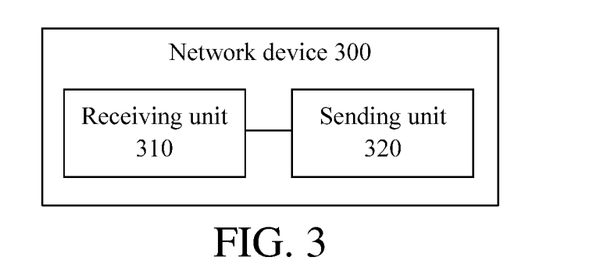
FIG. 3 is a schematic block diagram of a network device according to some embodiments.

FIG. 3 is a schematic block diagram of a network device according to some embodiments. As shown in FIG. 3, the network device includes:

a generating unit 310 configured to generate indication information, the indication information indicating a first resource of a first uplink carrier and/or a second resource of a second uplink carrier that are/is used by a terminal device for non-contention random access, and a frequency of the first uplink carrier being different from a frequency of the second uplink carrier; and a transceiving unit 320 configured to send the indication information to the terminal device.

Optionally, the indication information includes identification information of the first uplink carrier and information for indicating the first resource.

Optionally, the indication information includes identification information of the second uplink carrier and information for indicating the second resource.

Optionally, the transceiving unit 320 is further configured to:

before the indication information is generated, receive a channel quality measurement report sent by the terminal device.

The generating unit 310 is configured to:

determine, according to the channel quality measurement report, an uplink carrier used by the terminal device for non-contention random access; and generate the indication information according to the uplink carrier used by the terminal device for non-contention random access.

Optionally, the channel quality measurement report includes: a reference signal received power RSRP and/or reference signal received quality RSRQ of a cell corresponding to the first uplink carrier and an RSRP and/or RSRQ of a cell corresponding to the second uplink carrier.

Optionally, the indication information includes: identification information of the first uplink carrier, identification information of the second uplink carrier, information for indicating the first resource, and information for indicating the second resource.

Optionally, the indication information further includes:

priority information corresponding to the first resource and/or priority information corresponding to the second resource.

Optionally, the transceiving unit 320 is further configured to:

before the indication information is generated, determine the priority information corresponding to the first resource and/or the priority information corresponding to the second resource according to at least one of the following information:

processing load of the first uplink carrier, processing load of the second uplink carrier, a load status of a physical random access channel PRACH resource of the first uplink carrier, and/or a load status of a PRACH resource of the second uplink carrier.

Optionally, the resource used by the terminal device for non-contention random access includes:

identification information of a preamble and a physical random access channel PRACH resource for sending the preamble.

Optionally, the transceiving unit 320 is configured to:

send radio resource control RRC signaling to the terminal device, the RRC signaling including the indication information.

Optionally, the transceiving unit 320 is configured to:

send a physical downlink control channel PDCCH order to the terminal device, the PDCCH order including the indication information.

Figure 4:
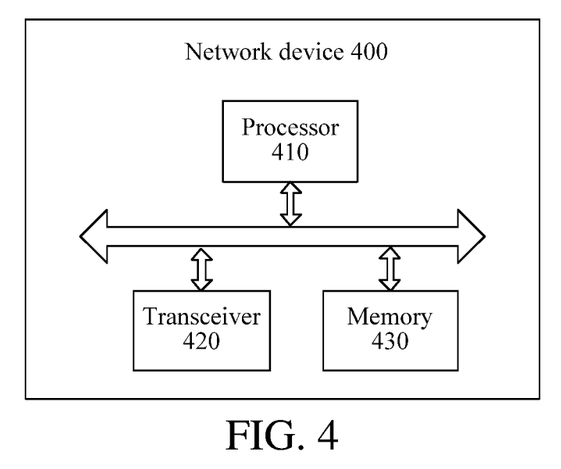
FIG. 4 is a schematic block diagram of another network device according to some embodiments.

It should be noted that the processing unit 310 may be implemented by a processor, and the transceiving unit 320 may be implemented by a transceiver. As shown in FIG. 4, a terminal device 400 may include a processor 410, a transceiver 420, and a memory 430. The memory 430 may be configured to store indication information, and may be further configured to store code, instructions, etc. executed by the processor 410. Components in the terminal device 400 are connected using a bus system, where the bus system includes a power bus, a control bus, and a status signal bus in addition to a data bus.

The terminal device 400 shown in FIG. 4 can implement various processes in the foregoing method embodiment of FIG. 2 that are implemented by the terminal device. In order to avoid repetition, details are not described herein again.

Figure 5:
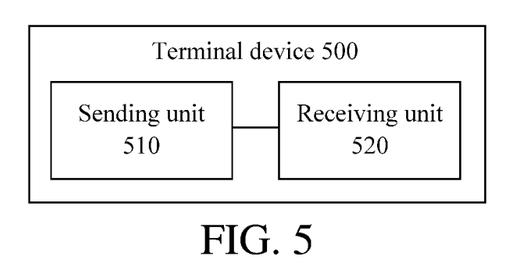
FIG. 5 is a schematic block diagram of a terminal device according to some embodiments.

FIG. 5 is a schematic block diagram of a terminal device according to an embodiment of the present invention. As shown in FIG. 5, a terminal device 500 includes:

a transceiving unit 510 configured to receive indication information sent by a network device, the indication information indicating a first resource of a first uplink carrier and/or a second resource of a second uplink carrier that are/is used by the terminal device for non-contention random access, and a frequency of the first uplink carrier being different from a frequency of the second uplink carrier; and a processing unit 520 configured to perform random access according to the indication information.

Optionally, the indication information includes identification information of the first uplink carrier and information for indicating the first resource.

Optionally, the indication information includes identification information of the second uplink carrier and information for indicating the second resource.

Optionally, the transceiving unit 510 is further configured to:

before receiving the indication information sent by the network device, send a channel quality measurement report to the network device, so that the network device generates the indication information according to the channel quality measurement report.

Optionally, the channel quality measurement report includes: a reference signal received power RSRP and/or reference signal received quality RSRQ of a cell corresponding to the first uplink carrier and an RSRP and/or RSRQ of a cell corresponding to the second uplink carrier.

Optionally, the indication information includes: identification information of the first uplink carrier, identification information of the second uplink carrier, information for indicating the first resource, and information for indicating the second resource.

Optionally, the indication information further includes:

priority information corresponding to the first resource and/or priority information corresponding to the second resource.

Optionally, the resource used by the terminal device for non-contention random access includes:

identification information of a preamble and a physical random access channel PRACH resource for sending the preamble.

Optionally, the transceiving unit 510 is configured to:

receive radio resource control RRC signaling sent by the network device, the RRC signaling including the indication information.

Optionally, the transceiving unit 510 is configured to:
receive a physical downlink control channel PDCCH order sent by the network device, the PDCCH order including the indication information.

Figure 6:
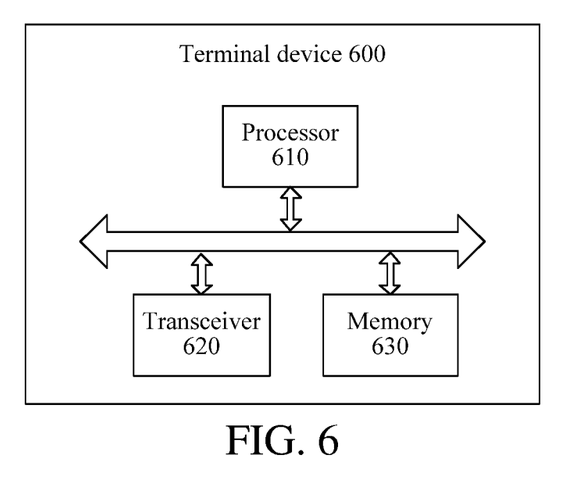
FIG. 6 is a schematic block diagram of another terminal device according to some embodiments.

It should be noted that the transceiving unit 510 may be implemented by a transceiver, and the processing unit 520 may be implemented by a processor. As shown in FIG. 6, a terminal device 600 may include a processor 610, a transceiver 620, and a memory 630. The memory 630 may be configured to store indication information, and may be further configured to store code, instructions, etc. executed by the processor 610. Components in the terminal device 600 are connected using a bus system, where the bus system includes a power bus, a control bus, and a status signal bus in addition to a data bus.

The terminal device 600 shown in FIG. 6 can implement various processes in the foregoing method embodiment of FIG. 2 that are implemented by the terminal device. In order to avoid repetition, details are not described herein again.

It should be understood that, methods of the disclosed embodiments may be applied in a processor or be implemented by the processor.

In an implementation process, steps in methods of the disclosed embodiments can be completed by using a hardware integrated logical circuit in the processor, or by using instructions in a form of software. More specifically, steps of the methods disclosed with reference to the disclosed embodiments may be directly executed and accomplished by using a hardware decoding processor, or may be executed and accomplished by using a combination of hardware and software modules in a decoding processor. The software module may be located in a mature storage medium in the art, such as a random access memory, a flash memory, a read-only memory, a programmable read-only memory, an electrically-erasable programmable memory, or a register. The storage medium is located in the memory, and the processor reads information in the memory and completes the steps in the foregoing methods in combination with hardware of the processor.

The processor may be an integrated circuit chip, has a signal processing capability, and can implement or perform various methods, steps, and logical block diagrams disclosed in embodiments. For example, the processor may be a general-purpose processor, a digital signal processor (DSP), an application-specific integrated circuit (ASIC), a field-programmable gate array (FPGA), or another programmable logic device, a transistor logic device, a discrete hardware component, or the like. In addition, the general purpose processor may be a microprocessor or the processor may be any conventional processor or the like.

In addition, in the disclosed embodiments, the memory may be a volatile memory or a non-volatile memory, or may include both a volatile memory and a non-volatile memory. The non-volatile memory may be a read-only memory (ROM), a programmable read only memory (PROM), an erasable programmable read only memory (EPROM), an electrically erasable programmable read-only memory (EEPROM), or a flash memory. The volatile memory may be a random access memory (RAM) that serves as an external cache. It should be understood that the foregoing memory is an exemplary but not limiting description. For example, the memory in some embodiments may also be a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), synchronous link dynamic random access memory (synch link DRAM, SLDRAM), a direct rambus random access memory (DR RAM), etc. In other words, the memories of the system and the method described herein are intended to include, but are not limited to, these and any other suitable types of memories.

Finally, it should be noted that, terms used in the disclosed embodiments and appended claims are merely intended to describe particular embodiments rather than limit the embodiments of the present invention.

For example, the terms "a," "said," and "the" of singular forms used in the embodiments and the appended claims of the present invention are also intended to include plural forms, unless otherwise specified in the context clearly.

For another example, depending on context, the word "when" used herein may be explained as "if," "in response to determining" or "in response to detecting." Similarly, depending on context, the phase "if determining" or "if detecting (a condition or event for description)" may be explained as "when determining" or "in response to determining" or "when detecting (a condition or event for description)" or "in response to detecting (a condition or event for description)."

A person of ordinary skill in the art would be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the embodiments of the present invention.

It would be clearly understood by a person skilled in the art that, for the purpose of a convenient and brief description, for a detailed working process of the foregoing system, apparatus, and unit, refer to a corresponding process in the foregoing method embodiments, and details are not described herein again.

In the embodiments provided in this application, it should be understood that the disclosed system, apparatus, and method may be implemented in other manners. For example, the described apparatus embodiments are merely examples. For example, the unit division can be merely a logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units can be selected according to actual needs to achieve the objective of disclosed embodiments.

In addition, functional "units" of the embodiments of the present invention may be integrated into one processing unit (e.g., a processor), or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the embodiments of the present invention essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or some of the steps of the method described in the embodiments of the present invention. The foregoing storage medium includes any medium that can store program code, such as a USB flash drive, a removable hard disk, a read-only memory, a random access memory, a magnetic disk, or an optical disc.

The foregoing content is merely specific implementations of the embodiments of the present invention and is not intended to limit the protection scope of the embodiments of the present invention. Any variation or replacement can be readily understood by a person skilled in the art within the technical scope disclosed in the embodiments of the present invention shall fall within the protection scope of the embodiments of the present invention. Therefore, the scope of protection of the embodiments of the present invention shall be subject to the scope of protection of the claims.

What is claimed is:

1. A method for new radio (NR) comprising:
   generating, by a network device, indication information, wherein the indication information is configured to indicate one of at least two uplink carriers that is used by a terminal device to perform non-contention random access, wherein the at least two uplink carriers at least comprise an uplink carrier and a supplementary uplink carrier; and
   sending, by the network device, the indication information to the terminal device,
   wherein the indication information comprises:
   identification information of a non-supplementary uplink carrier and information for indicating a resource of the non-supplementary uplink carrier; or identification information of the supplementary uplink carrier and information for indicating a resource of the supplementary uplink carrier; and
   priority information corresponding to a resource of a non-supplementary uplink carrier of the at least two uplink carriers or priority information corresponding to a resource of a supplementary uplink carrier of the at least two uplink carriers;
   wherein before generating, by the network device, the indication information, the method further comprises: receiving, by the network device, a channel quality measurement report sent by the terminal device; and determining, one from the at least two uplink carriers to be used by the terminal device for non-contention random access; and
   wherein the channel quality measurement report comprises: one or more of a reference signal received power (RSRP) or a reference signal received quality (RSRQ) of a first cell, the first cell corresponding to the non-supplementary uplink carrier; and one or more of an RSRP or an RSRQ of a second cell, the second cell corresponding to the supplementary uplink carrier.

2. The method of claim 1 further comprising, prior to generating the indication information:
   determining, by the network device, the priority information corresponding to the resource of the non-supplementary uplink carrier or the priority information corresponding to the resource of the supplementary uplink carrier according to at least one or more of the following information:
   processing a load of the non-supplementary uplink carrier, processing a load of the supplementary uplink carrier, processing a load status of a physical random access channel (PRACH) resource of the non-supplementary uplink carrier, or processing a load status of a PRACH resource of the supplementary uplink carrier.

3. The method of claim 1, wherein a resource of the one of at least two uplink carriers that is used by the terminal device to perform non-contention random access comprises:
   identification information of a preamble and a physical random access channel (PRACH) resource for sending the preamble.

4. The method of claim 1, wherein the sending of the indication information to the terminal device comprises:
   sending, by the network device, a radio resource control (RRC) signaling to the terminal device, the RRC signaling comprising the indication information.

5. The method of claim 1, wherein the sending of the indication information to the terminal device comprises:
   sending, by the network device, a physical downlink control channel (PDCCH) order to the terminal device, wherein the PDCCH order comprises the indication information.

6. A method for new radio (NR) comprising:
   receiving, by a terminal device, indication information sent by a network device, wherein the indication information is configured to indicate one of at least two uplink carriers that is used by the terminal device to perform non-contention random access, wherein the at least two uplink carriers at least comprise an uplink carrier and a supplementary uplink carrier; and
   performing, by the terminal device, random access according to the indication information,
   wherein the indication information comprises:
   identification information of a non-supplementary uplink carrier and information for indicating a resource of the non-supplementary uplink carrier; or identification information of the supplementary uplink carrier and information for indicating a resource of the supplementary uplink carrier; and
   priority information corresponding to a resource of a non-supplementary uplink carrier of the at least two uplink carriers or priority information corresponding to a resource of a supplementary uplink carrier of the at least two uplink carriers;
   wherein before receiving the indication information sent by the network device, the method further comprises: sending, by the terminal device, a channel quality measurement report to the network device; and
   wherein the channel quality measurement report comprises: one or more of a reference signal received power (RSRP) or a reference signal received quality (RSRQ) of a first cell, the first cell corresponding to the non-supplementary uplink carrier; and one or more of an RSRP or an RSRQ of a second cell, the second cell corresponding to the supplementary uplink carrier.

7. The method of claim 6, wherein a resource of the one of at least two uplink carriers that is used by the terminal device to perform non-contention random access comprises:
identification information of a preamble and a physical random access channel (PRACH) resource for sending the preamble.

8. The method of claim 6, wherein the receiving of the indication information sent by the network device comprises:
receiving, by the terminal device, a radio resource control (RRC) signaling sent by the network device, the RRC signaling comprising the indication information.

9. The method of claim 6, wherein the receiving, by the terminal device, indication information sent by the network device comprises:
receiving, by the terminal device, a physical downlink control channel (PDCCH) order sent by the network device, the PDCCH order comprising the indication information.

10. A network device for new radio (NR) comprising:
a processor including:
a generating unit configured to generate indication information, the indication information indicating one of at least two uplink carriers that is used by a terminal device to perform non-contention random access, wherein the at least two uplink carriers at least comprise an uplink carrier and a supplementary uplink carrier; and
a transceiver configured to send the indication information to the terminal device,
wherein the indication information comprises:
identification information of a non-supplementary uplink carrier and information for indicating a resource of the non-supplementary uplink carrier; or identification information of the supplementary uplink carrier and information for indicating a resource of the supplementary uplink carrier; and
priority information corresponding to a resource of a non-supplementary uplink carrier of the at least two uplink carriers or priority information corresponding to a resource of a supplementary uplink carrier of the at least two uplink carriers;
wherein the transceiver is further configured to:
before the indication information is generated, receive a channel quality measurement report sent by the terminal device; and
determine, one from the at least two uplink carriers to be used by the terminal device for non- contention random access; and
wherein the channel quality measurement report comprises: one or more a reference signal received power (RSRP) or a reference signal received quality (RSRQ) of a first cell, the first cell corresponding to the non-supplementary uplink carrier; and one or more of an RSRP or RSRQ of a second cell, the second cell corresponding to the supplementary uplink carrier.

11. The network device of claim 10, wherein a resource of the one of at least two uplink carriers that is used by the terminal device to perform non-contentional random access comprises:
identification information of a preamble and a physical random access channel (PRACH) resource for sending the preamble.

12. The network device of claim 10, wherein the transceiver is configured to:
send a radio resource control (RRC) signaling to the terminal device, the RRC signaling comprising the indication information.

13. The network device of claim 10, wherein the transceiver is configured to:
send a physical downlink control channel (PDCCH) order to the terminal device, wherein the PDCCH order comprises the indication information.

14. A terminal device for new radio (NR) comprising:
a transceiver configured to receive indication information sent by a network device, the indication information indicating one of at least two uplink carriers that is used by the terminal device to perform non-contention random access, wherein the at least two uplink carriers at least comprise an uplink carrier and a supplementary uplink carrier; and
a processor configured to perform random access according to the indication information,
wherein the indication information comprises:
identification information of a non-supplementary uplink carrier and information for indicating a resource of the non-supplementary uplink carrier; or identification information of the supplementary uplink carrier and information for indicating a resource of the supplementary uplink carrier; and
priority information corresponding to a resource of a non-supplementary uplink carrier of the at least two uplink carriers or priority information corresponding to a resource of a supplementary uplink carrier of the at least two uplink carriers
wherein the transceiver is further configured to:
before the indication information sent by the network device is received, send a channel quality measurement report to the network device, so that the network device generates the indication information according to the channel quality measurement report; and
wherein the channel quality measurement report comprises: one or more of a reference signal received power (RSRP) or a reference signal received quality (RSRQ) of a first cell, the first cell corresponding to the non-supplementary uplink carrier; and one or more of an RSRP or an RSRQ of a second cell, the second cell corresponding to the supplementary uplink carrier.

15. The terminal device of claim 14, wherein a resource of the one of at least two uplink carriers that is used by a terminal device to perform non-contention random access comprises:
identification information of a preamble and a physical random access channel (PRACH) resource for sending the preamble.

16. The terminal device of claim 14, wherein the transceiver is configured to:
receive a radio resource control (RRC) signaling sent by the network device, the RRC signaling comprising the indication information.

17. The terminal of claim 14, wherein the transceiver is configured to:
receive a physical downlink control channel (PDCCH) order sent by the network device, wherein the PDCCH order comprises the indication information.

* * * * *